(No Model.)
J. H. WYGANT.
Nut-Lock.
No. 226,947. Patented April 27, 1880.
Fig: 1.
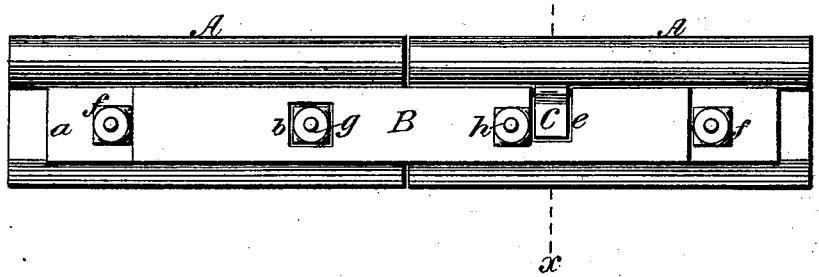
Fig: 2.
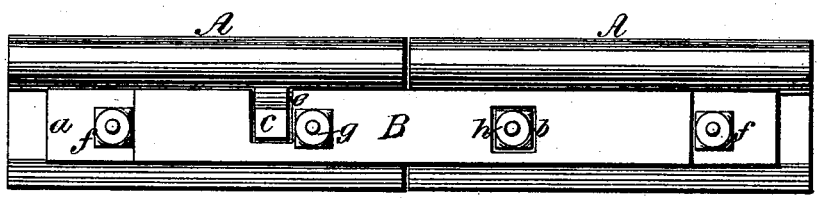
Fig: 3.
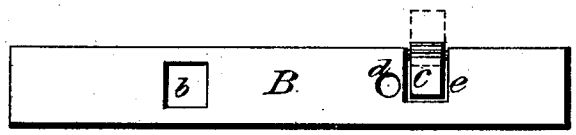
Fig: 4.
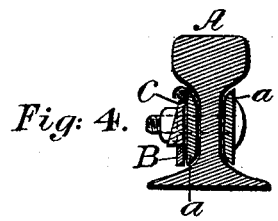
Witnesses:
John C. Tunbridge
Willy G. E. Schultz
Inventor:
John H. Wygant
By his Attorney
A. v. Briesen
N. PETERS, PHOTO-LITHOGRAPHER, WASHINGTON, D. C.

United States Patent Office.

JOHN H. WYGANT, OF HACKENSACK, NEW JERSEY, ASSIGNOR OF ONE-HALF OF HIS RIGHT TO ALBERT A. H. SMITH, OF SAME PLACE.

NUT-LOCK.

SPECIFICATION forming part of Letters Patent No. 226,947, dated April 27, 1880.

Application filed March 6, 1880. (No model.)

*To all whom it may concern:*

Be it known that I, JOHN H. WYGANT, of Hackensack, in the county of Bergen and State of New Jersey, have invented a new and Improved Nut-Lock, of which the following is a specification.

My invention relates to improvements in that class of nut-locks wherein a plate provided with mortises to receive the intermediate nuts is applied to the bolts, so that the ends abut against the nuts at the extremities of the fish-plate, and the intermediate nuts held by the mortises, while one of the bolts projects through a bolt-hole in the locking-plate, and by means of a nut screwed on the said bolt the plate is fastened against the fish-plate.

The object of my invention is to arrange the locking-plate so that either one of the intermediate bolts on each side of the junction of the two rails, which are equally distant from the said junction, can be used as the fastening-bolt for the locking-plate, and the nut of the said fastening-bolt can be locked by a reversible swinging piece connected with the locking-plate.

In the accompanying drawings, Figure 1 represents, in side elevation, a railway-joint with my improved nut-locking plate applied thereto in one position. Fig. 2 represents the same with the locking-plate in a reverse position. Fig. 3 represents a face view of the locking-plate; and Fig. 4 represents a vertical cross-section of one of the rails with the fish-plates for the nut which fastens the locking-plate B to the fish-plate, and as it swings through the recess its broad edge will project through and beyond the surface of both sides of the plate.

The manner of applying the plate is as follows: The length of the plate B is sufficient to permit it to be placed between the two extreme nuts, $f f$, of the fish-joint, so that its ends will be close to or in contact with the sides of the said nuts, and thereby prevent them from turning, and one of the intermediate nuts, $g$, on one side of the junction of the rails, will enter the mortise $b$. The other intermediate nut, $h$, is in position to cover the bolt-hole $d$ in the plate B. The plate is applied to the joint after the nuts $f f$ and $g$ have been drawn against the fish-plate, but before the nut $h$ is applied. The bolt intended to hold the nut $h$ passes through the hole $d$, the nut $g$ enters the mortise $b$, and the ends of plate B abut against the nuts $f f$. On the end of the bolt which protrudes through the bolt-hole $d$ the nut $h$ is next screwed, the swinging piece C being raised while the nut is being turned; but as soon as it is tight enough against the plate B and one of its sides is parallel to the side of the recess $e$, the said piece C is allowed to drop to a pendent position, as shown in the drawings, and in this position, owing to its wedge shape, it projects out beyond the surface of the plate B, as shown in Fig. 4, and thereby this nut is locked in position, whereby the plate B locks the nuts $f f g$, and the swinging piece C, locking the nut in case the bolt which is used on one side as a fastening-bolt should break, the plate can be reversed and attached to the fish-plate and joint by the bolt on the opposite side; and as either bolt, which is equally distant from the end of the rail through which it is passed, will serve as a fastening-bolt, it follows that no care is required to get the plate in a fixed position to apply it to the joint.

By weighting the lower end of the swinging plate C it is held in proper position, and not liable to be turned up spontaneously during the jarring of the rails.

I claim—

In combination with the locking-plate B, which is reversible, as described, and provided with the angular mortise $b$, bolt-hole $d$, and recess $e$, the wedge-shaped swinging piece C, adapted to swing through the recess from either side of the plate B, said piece C lying flat against the fish-plate on one side and projecting on the other side, substantially as described.

JOHN H. WYGANT.

Witnesses:
WILTON C. DONN,
WILLY G. E. SCHULTZ.